(12) United States Patent
Jung et al.

(10) Patent No.: US 10,986,595 B2
(45) Date of Patent: Apr. 20, 2021

(54) TRANSMITTING AND RECEIVING A SYNCHRONIZATION SIGNAL BLOCK

(71) Applicant: Motorola Mobility LLC, Chicago, IL (US)

(72) Inventors: Hyejung Jung, Palatine, IL (US); Vijay Nangia, Woodridge, IL (US); Ravi Kuchibhotla, Clarendon Hills, IL (US); Ravikiran Nory, Buffalo Grove, IL (US); Ziad Ahmad, Chicago, IL (US); Robert Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 110 days.

(21) Appl. No.: 15/890,112

(22) Filed: Feb. 6, 2018

(65) Prior Publication Data

US 2018/0227866 A1 Aug. 9, 2018

Related U.S. Application Data

(60) Provisional application No. 62/455,542, filed on Feb. 6, 2017.

(51) Int. Cl.
*H04W 56/00* (2009.01)
*H04L 5/00* (2006.01)

(52) U.S. Cl.
CPC ......... *H04W 56/001* (2013.01); *H04L 5/0053* (2013.01); *H04L 5/0007* (2013.01)

(58) Field of Classification Search
None
See application file for complete search history.

(56) References Cited

U.S. PATENT DOCUMENTS

| 9,591,649 | B1* | 3/2017 | Liu | H04W 72/0486 |
| 2007/0217440 | A1* | 9/2007 | Cho | H04L 5/0053 370/431 |
| 2008/0009305 | A1* | 1/2008 | Li | H04L 5/0051 455/522 |
| 2009/0168927 | A1* | 7/2009 | Bachu | H04L 1/0072 375/341 |
| 2010/0120424 | A1* | 5/2010 | Johansson | H04L 5/0053 455/435.1 |
| 2011/0013730 | A1* | 1/2011 | Mansson | H04B 7/0689 375/340 |

(Continued)

FOREIGN PATENT DOCUMENTS

CN 106850165 B * 3/2019

OTHER PUBLICATIONS

Machine translation to English for CN 106850165B (Year: 2016).*

(Continued)

*Primary Examiner* — Andre Tacdiran
(74) *Attorney, Agent, or Firm* — Kunzler Bean & Adamson

(57) ABSTRACT

Apparatuses, methods, and systems are transmitting and/or receiving a synchronization signal block. One method includes receiving a synchronization signal block. The method includes detecting a primary synchronization signal and a broadcast channel of the synchronization signal block. Receiving the synchronization signal block includes receiving at least one synchronization signal block of multiple synchronization signal blocks within a time window and the broadcast channel includes multiple sub-bands.

22 Claims, 10 Drawing Sheets

(56) References Cited

U.S. PATENT DOCUMENTS

| | | | | |
|---|---|---|---|---|
| 2011/0164707 A1* | 7/2011 | Luo | H04L 1/0045 | 375/341 |
| 2013/0044692 A1* | 2/2013 | Nory | H04L 5/0048 | 370/329 |
| 2013/0115944 A1* | 5/2013 | Tavildar | H04W 48/12 | 455/434 |
| 2013/0155990 A1* | 6/2013 | Nishio | H04L 5/0053 | 370/329 |
| 2013/0343318 A1* | 12/2013 | Gruet | H04L 25/0224 | 370/329 |
| 2014/0031031 A1* | 1/2014 | Gauvreau | H04L 5/0053 | 455/426.1 |
| 2014/0073372 A1* | 3/2014 | Lee | H04W 74/0841 | 455/518 |
| 2014/0301305 A1* | 10/2014 | Xu | H04W 72/04 | 370/329 |
| 2015/0341908 A1* | 11/2015 | Wang | H04L 5/0053 | 370/312 |
| 2017/0237476 A1* | 8/2017 | Kim | H04B 7/0617 | 370/329 |
| 2017/0367069 A1* | 12/2017 | Agiwal | H04W 68/005 | |
| 2018/0034599 A1* | 2/2018 | Zhou | H04L 5/0007 | |
| 2018/0035372 A1* | 2/2018 | Pradas | H04W 76/28 | |
| 2018/0054289 A1* | 2/2018 | Kim | H04W 4/38 | |
| 2018/0115996 A1* | 4/2018 | Si | H04W 74/0808 | |
| 2018/0131489 A1* | 5/2018 | Ly | H04L 5/0051 | |
| 2018/0167946 A1* | 6/2018 | Si | H04L 1/0061 | |
| 2018/0176065 A1* | 6/2018 | Deng | H04B 7/088 | |
| 2018/0184391 A1* | 6/2018 | Ly | H04L 27/2657 | |
| 2018/0220360 A1* | 8/2018 | Sheng | H04J 11/0073 | |
| 2019/0238270 A1* | 8/2019 | Pan | H04W 74/0833 | |
| 2020/0100214 A1* | 3/2020 | Wei | H04L 1/0041 | |

OTHER PUBLICATIONS

PCT/US2018/017096, Notification of Transmittal of the International Search Report and the Written Opinion of the International Searching Authority, or the Declaration, May 17, 2018, pp. 1-12.

Huawei, Hisilicon, "Frequency Location of the Synchronization Signals", 3GPP TSG RAN WG1 NR Ad Hock Meeting, R1-1700038, Jan. 16-20, 2017, pp. 1-8.

LG Electronics, NR PBCH Design, 3GPP TSG RAN WG1 NR Ad-Hoc Meeting, R1-1700460, Jan. 16-20, 2017, pp. 1-10.

Motorola Mobility, Lenovo, "Numerology and Structure for NR Synchronization Signal", 3GPP TSG RAN WG1 Meeting #88, R1-1703043, Feb. 13-17, 2017, pp. 1-3.

Huawei, Hisilicon, "On the Maximum Carrier Bandwidth and Multiple Carrier Operation", 3GPP TSG RAN WG1 NR Ad Hoc Meeting, R1-1700006, Jan. 16-20, 2017, pp. 1-6.

* cited by examiner

TRANSMITTING AND RECEIVING A SYNCHRONIZATION SIGNAL BLOCK

CROSS-REFERENCE TO RELATED APPLICATIONS

This application claims priority to U.S. Patent Application Ser. No. 62/455,542 entitled "WIDEBAND PBCH AND SS BLOCK LOCATION FOR FLEXIBLE RADIO COMMUNICATION" and filed on Feb. 6, 2017 for Hyejung Jung, which is incorporated herein by reference in its entirety.

FIELD

The subject matter disclosed herein relates generally to wireless communications and more particularly relates to transmitting and/or receiving a synchronization signal block.

BACKGROUND

The following abbreviations are herewith defined, at least some of which are referred to within the following description: Third Generation Partnership Project ("3GPP"), Fifth Generation ("5G"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSF"), Bandwidth ("BW"), Cell Radio Network Temporary Identifier ("C-RNTI"), Common Physical Downlink Control Channel ("C-PDCCH"), Dedicated Control Channel ("DCCH"), Downlink ("DL"), Demodulation Reference Signal ("DMRS"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Logical Channel Identifier ("LCID"), Long Term Evolution ("LTE"), Multiple Access ("MA"), Medium Access Control ("MAC"), Modulation Coding Scheme ("MCS"), Mobile Country Code ("MCC"), Mobile Network Code ("MNC"), Machine Type Communication ("MTC"), Master Information Block ("MIB), Mobility Management ("MM"), Mobility Management Entity ("MME"), Non-Access Stratum ("NAS"), Narrowband ("NB"), Negative-Acknowledgment ("NACK") or ("NAK"), Network Entity ("NE"), Next Generation Node B ("gNB"), Orthogonal Frequency Division Multiplexing ("OFDM"), Over-the-Air ("OTA"), Physical Broadcast Channel ("PBCH"), Policy Control Function ("PCF"), Packet Data Convergence Protocol ("PDCP"), Protocol Data Unit ("PDU"), Public Land Mobile Network ("PLMN"), Primary Synchronization Signal ("PSS"), Pointer ("PTR"), Quality of Service ("QoS"), Random Access Channel ("RACH"), Radio Access Technology ("RAT"), Resource Block ("RB"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal Received Power ("RSRP"), Reference Signal Received Quality ("RSRQ"), Receive ("RX"), Secondary Synchronization Signal ("SSS"), Service Data Unit ("SDU"), Sequence Number ("SN"), Single Carrier Frequency Division Multiple Access ("SC-FDMA"), Subscriber Management Function ("SMF"), Signal-to-Noise Ratio ("SNR"), Subscriber Identity Module ("SIM"), System Information Block ("SIB"), Sidelink ("SL"), Shared Channel ("SCH"), Synchronization Signal ("SS"), Subscription Concealed Identifier ("SUCI"), Subscription Permanent Identifier ("SUPI"), Timing Advance Group ("TAG"), Tracking Area ("TA"), Time Division Duplex ("TDD"), Transport Network Layer ("TNL"), Transmission Time Interval ("TTI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Ultra-Reliable Low-Latency Communication ("URLLC"), Universal Subscriber Identity Module ("USIM"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a synchronization signal block may be transmitted and/or received. In such networks, the synchronization signal block may include a primary synchronization signal.

BRIEF SUMMARY

Methods for receiving a synchronization signal block are disclosed. Apparatuses and systems also perform the functions of the apparatus. In one embodiment, the method includes receiving a synchronization signal block. In various embodiments, the method includes detecting a primary synchronization signal and a broadcast channel of the synchronization signal block. In some embodiments, receiving the synchronization signal block includes receiving at least one synchronization signal block of multiple synchronization signal blocks within a time window and the broadcast channel includes multiple sub-bands.

In certain embodiments, at least one sub-band of the multiple sub-bands carries a self-decodable unit. In one embodiment, the method includes detecting at least one secondary synchronization signal of the synchronization signal block. In a further embodiment, each sub-band of the multiple sub-bands carries at least one self-decodable unit. In certain embodiments, a first sub-band of the multiple sub-bands is a same size as a second sub-band of the multiple sub-bands. In various embodiments, a first sub-band of the multiple sub-bands is a different size than a second sub-band of the multiple sub-bands. In some embodiments, a first sub-band of the multiple sub-bands is located at a central portion of the broadcast channel, and a second sub-band of the multiple sub-bands is located on both sides of the central portion. In certain embodiments, the method includes receiving only the first sub-band and decoding channel bits transmitted on the first sub-band.

In various embodiments, the at least one self-decodable unit includes coded and rate-matched channel bits. In some embodiments, the primary synchronization signal, at least one secondary synchronization signal, and the broadcast channel are transmitted in one slot. In certain embodiments, the method includes determining slot and frame timing information from the synchronization signal block. In various embodiments, the time window including the multiple synchronization signal blocks occurs periodically. In some embodiments, the time window includes 5 ms or 10 ms. In certain embodiments, the broadcast channel carries a system frame number. In various embodiments, the broadcast channel carries slot and frame timing related information.

In some embodiments, the method includes: receiving a common control channel in a first slot; determining whether a synchronization signal block is transmitted in a downlink region of the first slot based on the common control channel; and identifying available downlink resource elements for a physical downlink shared channel or a physical downlink control channel in the downlink region of the first slot. In certain embodiments, the first slot is within a synchronization signal block transmission window, and the synchronization signal block transmission window includes at least one slot for transmitting synchronization signal blocks. In various embodiments, a size of a downlink control region of the first slot is different from a size of a downlink control region of a second slot, and the second slot is not within the synchronization signal block transmission window.

An apparatus for receiving a synchronization signal block, in one embodiment, includes a receiver that receives a synchronization signal block. The apparatus, in certain embodiments, includes a processor that detects a primary synchronization signal and a broadcast channel of the synchronization signal block. In some embodiments, receiving the synchronization signal block includes receiving at least one synchronization signal block of multiple synchronization signal blocks within a time window and the broadcast channel includes multiple sub-bands.

One method for transmitting a synchronization signal block includes determining a synchronization signal block including a primary synchronization signal and a broadcast channel. In various embodiments, the method includes transmitting the synchronization signal block. In certain embodiments, transmitting the synchronization signal block includes transmitting multiple synchronization signal blocks within a time window and the broadcast channel includes multiple sub-bands.

In certain embodiments, at least one sub-band of the multiple sub-bands carries a self-decodable unit. In one embodiment, the method includes determining at least one secondary synchronization signal of the synchronization signal block. In a further embodiment, each sub-band of the multiple sub-bands carries at least one self-decodable unit. In certain embodiments, a first sub-band of the multiple sub-bands is a same size as a second sub-band of the multiple sub-bands. In various embodiments, a first sub-band of the multiple sub-bands is a different size than a second sub-band of the multiple sub-bands. In some embodiments, a first sub-band of the multiple sub-bands is located at a central portion of the broadcast channel, and a second sub-band of the multiple sub-bands is located on both sides of the central portion.

In various embodiments, the at least one self-decodable unit includes coded and rate-matched channel bits. In some embodiments, the primary synchronization signal, at least one secondary synchronization signal, and the broadcast channel are transmitted in one slot. In certain embodiments, slot and frame timing information are determined from the synchronization signal block. In various embodiments, the time window including the multiple synchronization signal blocks occurs periodically. In some embodiments, the time window includes 5 ms or 10 ms. In certain embodiments, the broadcast channel carries a system frame number. In various embodiments, the broadcast channel carries slot and frame timing related information.

In some embodiments, the method includes transmitting a common control channel in a first slot. In certain embodiments, the first slot is within a synchronization signal block transmission window, and the synchronization signal block transmission window includes at least one slot for transmitting synchronization signal blocks. In various embodiments, a size of a downlink control region of the first slot is different from a size of a downlink control region of a second slot, and the second slot is not within the synchronization signal block transmission window.

An apparatus for transmitting a synchronization signal block, in one embodiment, includes a processor that determines a synchronization signal block including a primary synchronization signal and a broadcast channel. In certain embodiments, the apparatus includes a transmitter that transmits the synchronization signal block. In various embodiments, the transmitter transmitting the synchronization signal block includes the transmitter transmitting multiple synchronization signal blocks within a time window and the broadcast channel includes multiple sub-bands.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
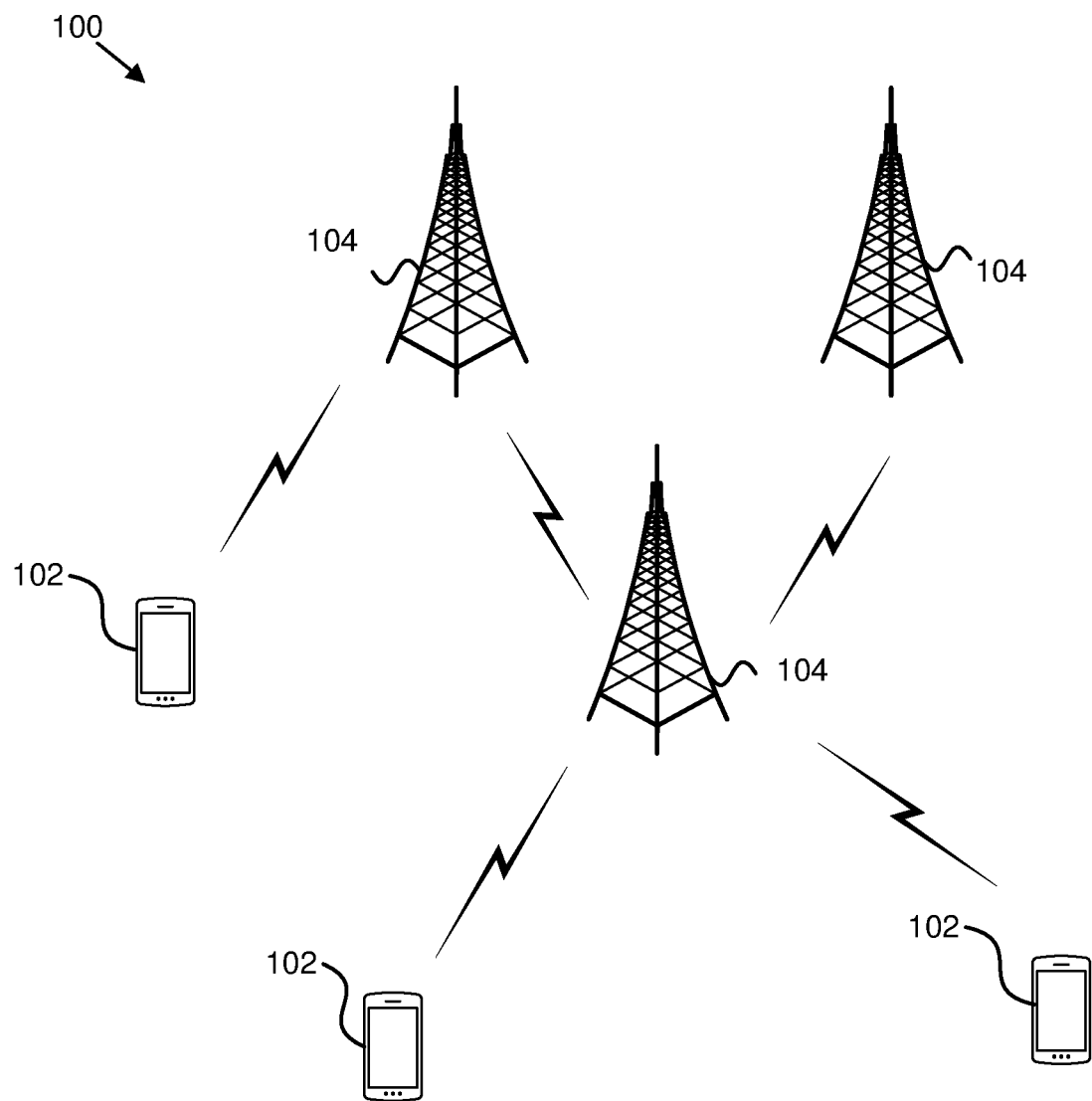
FIG. 1 is a schematic block diagram illustrating one embodiment of a wireless communication system for transmitting and/or receiving a synchronization signal block.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving a synchronization signal block. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In various embodiments, the remote units 102 may communicate directly with one or more other remote units 102.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, an infrastructure device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may receive a synchronization signal block. In various embodiments, the remote unit 102 may detect a primary synchronization signal and a broadcast channel of the synchronization signal block. In some embodiments, receiving the synchronization signal block includes receiving at least one synchronization signal block of multiple synchronization signal blocks within a time window and the broadcast channel includes multiple sub-bands. Accordingly, a remote unit 102 may be used for receiving a synchronization signal block.

In various embodiments, a network unit 104 may determine a synchronization signal block including a primary synchronization signal and a broadcast channel. In various embodiments, the network unit 104 may transmit the synchronization signal block. In certain embodiments, transmitting the synchronization signal block includes transmitting multiple synchronization signal blocks within a time window and the broadcast channel includes multiple sub-bands. Accordingly, a network unit 104 may be used for transmitting a synchronization signal block.

Figure 2:
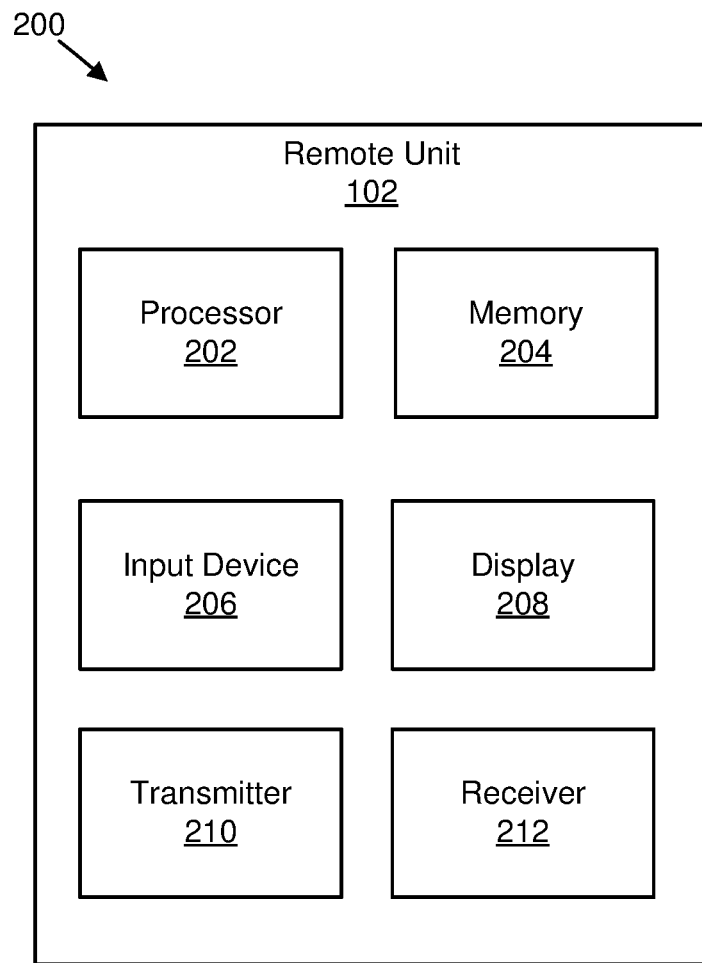
FIG. 2 is a schematic block diagram illustrating one embodiment of an apparatus that may be used for receiving a synchronization signal block.

FIG. 2 depicts one embodiment of an apparatus 200 that may be used for receiving a synchronization signal block. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may detect a primary synchronization signal and a broadcast channel of the synchronization signal block. In some embodiments, the broadcast channel includes at least one sub-band, and the at least one sub-band carries a self-decodable unit. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to synchronization signal blocks. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 may receive a synchronization signal block. In some embodiments, the receiver 212 receiving the synchronization signal block includes the receiver 212 receiving at least one synchronization signal block of multiple synchronization signal blocks within a time window and the broadcast channel includes multiple sub-bands. In some embodiments, the primary synchronization signal, at least one secondary synchronization signal, and the broadcast channel are transmitted in one slot. In certain embodiments, the method includes determining slot and frame timing information from the synchronization signal block. In various embodiments, the time window including the multiple synchronization signal blocks occurs periodically. In some embodiments, the time window includes 5 ms or 10 ms. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
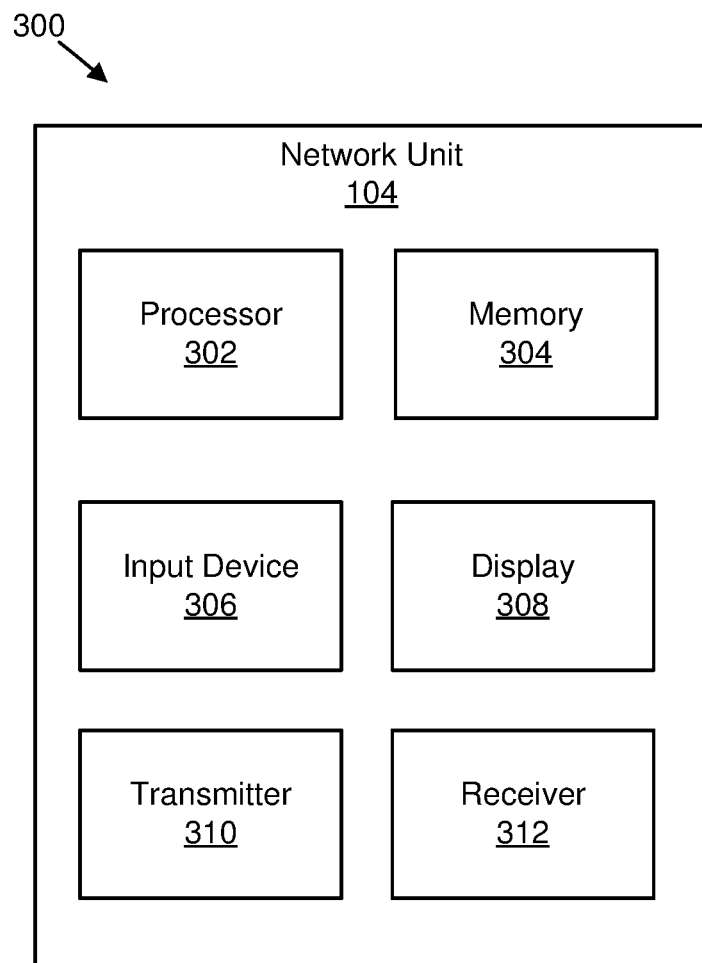
FIG. 3 is a schematic block diagram illustrating one embodiment of an apparatus that may be used for transmitting a synchronization signal block.

FIG. 3 depicts one embodiment of an apparatus 300 that may be used for transmitting a synchronization signal block. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 may determine a synchronization signal block including a primary synchronization signal and a broadcast channel. In certain embodiments, the transmitter 310 may transmit the synchronization signal block. In some embodiments, the transmitter 310 transmitting the synchronization signal block includes the transmitter 310 transmitting multiple synchronization signal blocks within a time window and the broadcast channel includes multiple sub-bands. In some embodiments, the primary synchronization signal, at least one secondary synchronization signal, and the broadcast channel are transmitted in one slot. In certain embodiments, slot and frame timing information are determined from the synchronization signal block. In various embodiments, the time window including the multiple synchronization signal blocks occurs periodically. In some embodiments, the time window includes 5 ms or 10 ms. In various embodiments, the broadcast channel includes at least one sub-band, and the at least one sub-band carries a self-decodable unit. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a minimum channel bandwidth of various networks (e.g., 5G RAT) may be larger than a minimum channel bandwidth of other networks (e.g., LTE, 1.4 MHz). In various embodiments, a transmission bandwidth of SS and/or PBCH of certain networks (e.g., 5G RAT) may be wider than a transmission bandwidth of other networks (e.g., LTE PSS and/or SSS, 1.08 MHz including guard subcarriers). In some embodiments, remote units 102 may operate in a network with a limited bandwidth (e.g., a receiver bandwidth of 1.4 MHz) and/or with a wideband bandwidth (e.g., a receiver bandwidth larger than 1.4 MHz), and a common PBCH for operation with the limited bandwidth and the wideband bandwidth is beneficial for efficient radio resource utilization.

In some embodiments, when PSS and/or SSS are transmitted with narrow beams, many SS blocks (each of which carries beamformed PSS and/or SSS) may be transmitted in order to cover multiple spatial directions. In one embodiment, an idle mode remote unit 102 may assume that an SS burst set including one or more SS blocks (e.g., up to two hundred SS blocks) is transmitted with 80 ms periodicity, and the remote unit 102 may detect one (or multiple) SS block transmitted with suitable transmit beams for the remote unit 102. In such embodiments, two hundred vertical and/or azimuth narrow beams may be considered to cover one sector; however, it may be difficult to predetermine locations of two hundred SS blocks, considering dynamic UL and/or DL operation in TDD. In various embodiments, an actual number of SS blocks may vary depending on a network implementation. In some embodiments, if a network entity employs wide beams for PSS and/or SSS transmission, the network entity may transmit a smaller number of SS blocks than two hundred SS blocks. In such embodiments, some flexibility to locate SS blocks may be available without resulting in too much signaling overhead for indicating the SS block location. In various embodiments, PBCH may be transmitted within SS blocks.

In certain embodiments, PBCH may be transmitted in 6 RBs of 1.08 MHz bandwidth, and one self-decodable unit of channel bits may be transmitted on 4 consecutive OFDM symbols. In some embodiments, such as dynamic TDD operation and/or URLLC services in 5G RAT, longer transmission duration may not be used for physical channels which are transmitted on predefined and/or known locations (e.g., PBCH), because it may restrict UL and/or DL switching flexibility.

In various embodiments, PSS and/or SSS may be transmitted once per a 5 ms periodicity, and, therefore, it may be difficult to efficiently locate multiple SS blocks (e.g., up to two hundred SS blocks) within a periodically transmitted SS burst set.

In some embodiments, for energy-efficient network operation, a network may minimize an "always-on" signal in the network. In various embodiments, a NE may set a periodicity of SS blocks including one or more synchronization signals and PBCH to a larger value. In such embodiments, a remote unit 102 may detect a cell network quickly even with an NE's sparse transmission of SS blocks in time. In certain embodiments, for RRC idle mode remote units 102, the remote units 102 may detect and/or measure a cell network based on one or more SS blocks that each include one or more SS and PBCH.

In some embodiments, a transmission BW for PSS and/or SSS may be determined to provide good one-shot detection probability at −6 dB received baseband SNR with less than 1% false alarm rate. In such embodiments, for a given SNR per sub-carrier and a given subcarrier spacing, a larger transmission BW (and a larger number of subcarriers and a longer PSS and/or SSS sequence) for PSS and/or SSS may provide better detection performance, as it may provide a larger processing gain. In some embodiments, length-63 PSS sequences may achieve a 1% missed detection rate at 3 dB SNR, while length-251 Zadoff-Chu ("ZC") sequence based PSS may have a −4.5 dB SNR for a 1% missed detection rate. In one embodiment, with subcarrier mapping of PSS and 15 KHz subcarrier spacing, the transmission BW for PSS may be set to 8.64 MHz (e.g., 48 RBs assuming 12 subcarriers in one RB), which is 8 times wider than certain SS bandwidths (e.g., 1.08 MHz, 6 RB). In such embodiments, assuming a same transmission BW for both PSS and SSS, certain SSS sequences may be approximately 8 times longer than other SSS, which may be beneficial for improving one-shot detection performance. In certain embodiments, applying a same set of PSS and/or SSS sequences as used in certain above embodiments to a frequency range above 6 GHz, the transmission BW for PSS and/or SSS may be 69.12 MHz with 120 KHz subcarrier spacing in the frequency range above 6 GHz.

Figure 4:
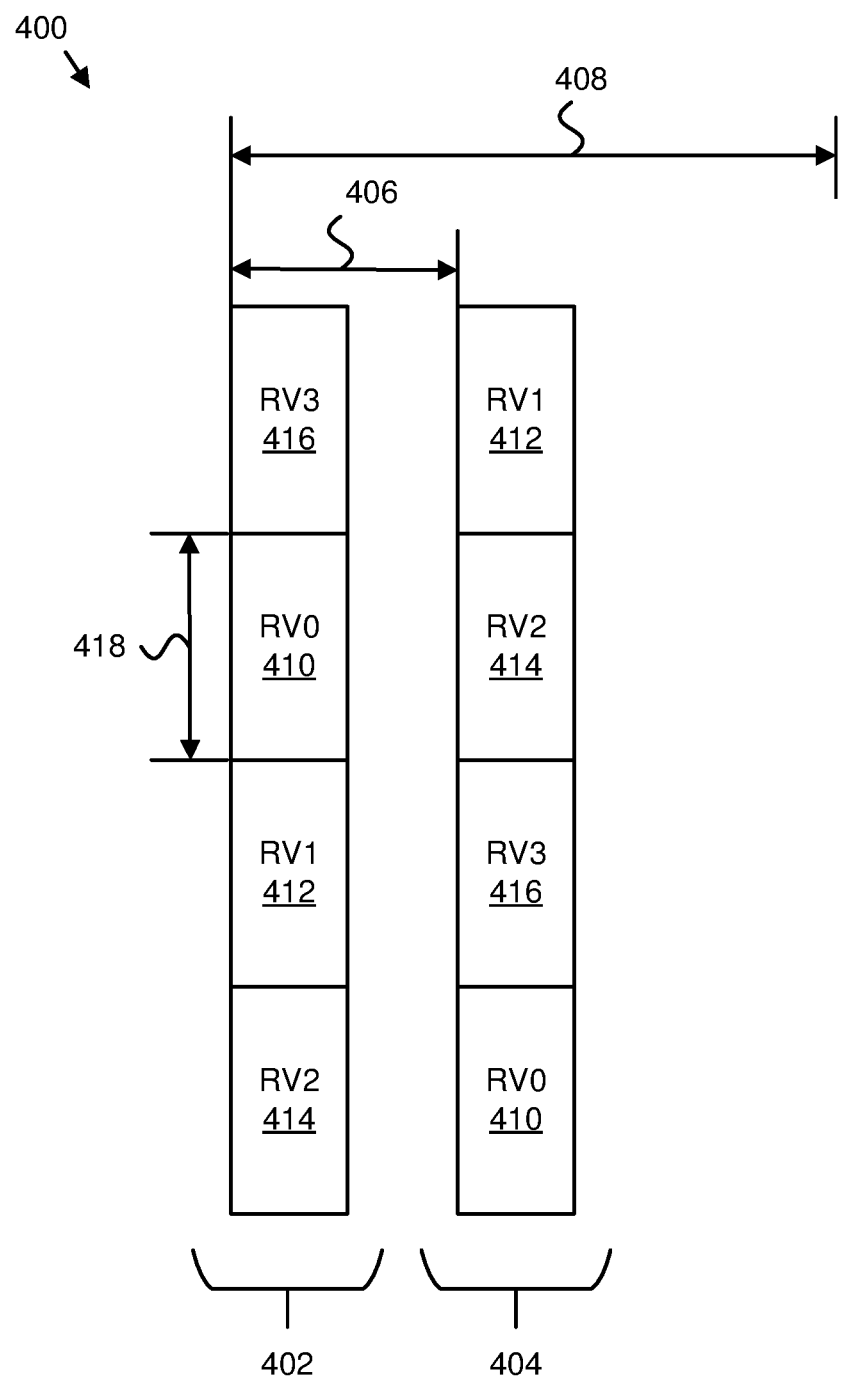
FIG. 4 illustrates one embodiment of wideband PBCH carried by four symbols.

FIG. 4 illustrates one embodiment of wideband PBCH 400 carried by four symbols. Specifically, a first transmission 402 (e.g., PBCH transmission) and a second transmission 404 (e.g., PBCH transmission) are illustrated. The first transmission 402 may be transmitted in a first time interval 406 that is part of an SS burst set periodicity 408. In some embodiments, the first time interval 406 may be approximately 20 ms; while in other embodiments, the first time interval 406 may have a different time interval. In various embodiments, the SS burst set periodicity 408 may be approximately 80 ms; while in other embodiments, the SS burst set periodicity 408 may have a different time interval. In certain embodiments, the first transmission 402 may include a first symbol RV0 410, a second symbol RV1 412, a third symbol RV2 414, and a fourth symbol RV3 416. In some embodiments, the first symbol RV0 410, the second symbol RV1 412, the third symbol RV2 414, and the fourth symbol RV3 416 may each have a bandwidth 418. In various embodiments, the bandwidth 418 may be 12 RBs; while, in other embodiments, the bandwidth 418 may have a different number of RBs. In certain embodiments, the first symbol RV0 410 and the second symbol RV1 412 (e.g., a first sub-band) are located at a central frequency portion of the first transmission 402, and the third symbol RV2 414 and the forth symbol RV3 416 (e.g., a second sub-band) are located on both sides of the central frequency portion. In such embodiments, the first sub-band and the second sub-band may be substantially the same size; while, in other embodiments, the first sub-band and the second sub-band may be different in size. In some embodiments, only the first sub-band may be received and/or decoded by a remote unit 102; while, in other embodiments, both the first sub-band and the second sub-band may be received and/or decoded by a remote unit 102. In various embodiments, the first sub-band and the second sub-band are both self-decodable units.

In certain embodiments, the second transmission 404 may include the first symbol RV0 410, the second symbol RV1 412, the third symbol RV2 414, and the fourth symbol RV3 416. In some embodiments, the first symbol RV0 410, the second symbol RV1 412, the third symbol RV2 414, and the fourth symbol RV3 416 may each have the bandwidth 418. In certain embodiments, the third symbol RV2 414 and the forth symbol RV3 416 (e.g., a first sub-band) are located at a central frequency portion of the second transmission 404, and the first symbol RV0 410 and the second symbol RV1 412 (e.g., a second sub-band) are located on both sides of the central frequency portion. In such embodiments, the first sub-band and the second sub-band may be substantially the same size; while, in other embodiments, the first sub-band and the second sub-band may be different in size. In some embodiments, only the first sub-band may be received and/or decoded by a remote unit 102; while, in other embodiments, both the first sub-band and the second sub-band may be received and/or decoded by a remote unit 102. In various embodiments, the first sub-band and the second sub-band are both self-decodable units. As may be appreciated, a remote unit 102 receiving the first sub-band of the first transmission 402 and the first sub-band of the second transmission 404 may receive the first symbol RV0 410, the second symbol RV1 412, the third symbol RV2 414, and the fourth symbol RV3 416. Furthermore, a remote unit 102 receiving the first and second sub-bands of the first transmission 402 and the first and second sub-bands of the second transmission 404 may receive the first symbol RV0 410, the second symbol RV1 412, the third symbol RV2 414, and the fourth symbol RV3 416, wherein each symbol is received twice in different time and frequency resources.

Figure 5:
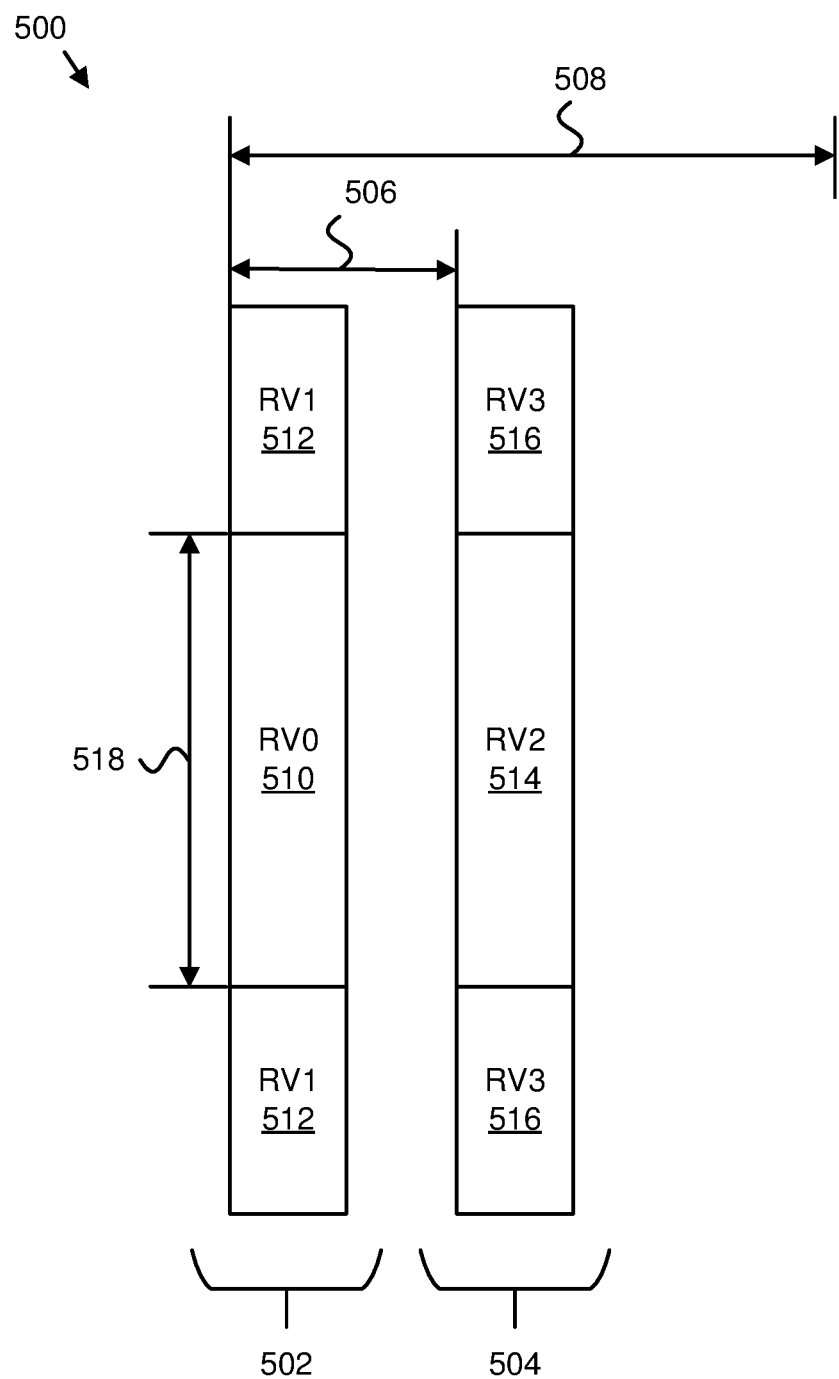
FIG. 5 illustrates one embodiment of wideband PBCH carried by two symbols.

FIG. 5 illustrates one embodiment of wideband PBCH 500 carried by two symbols. Specifically, a first transmission 502 (e.g., PBCH transmission) and a second transmission 504 (e.g., PBCH transmission) are illustrated. The first transmission 502 may be transmitted in a first time interval 506 that is part of an SS burst set periodicity 508. In some embodiments, the first time interval 506 may be approximately 20 ms; while in other embodiments, the first time interval 506 may have a different time interval. In various embodiments, the SS burst set periodicity 508 may be approximately 80 ms; while in other embodiments, the SS burst set periodicity 508 may have a different time interval. In certain embodiments, the first transmission 502 may include a first symbol RV0 510 and a second symbol RV1 512. In various embodiments, the second transmission 504 may include a third symbol RV2 514 and a fourth symbol RV3 516. In some embodiments, the first symbol RV0 510, the second symbol RV1 512, the third symbol RV2 514, and the fourth symbol RV3 516 may each have a bandwidth 518. In various embodiments, the bandwidth 518 may be 24 RBs; while, in other embodiments, the bandwidth 518 may have a different number of RBs. In certain embodiments, the first symbol RV0 510 (e.g., a first sub-band) is located at a central frequency portion of the first transmission 502, and the second symbol RV1 512 (e.g., a second sub-band) is located on both sides of the central frequency portion. In such embodiments, the first sub-band and the second sub-band may be substantially the same size; while, in other embodiments, the first sub-band and the second sub-band may be different in size. In some embodiments, only the first sub-band may be received and/or decoded by a remote unit 102; while, in other embodiments, both the first sub-band and the second sub-band may be received and/or decoded by a remote unit 102. In various embodiments, the first sub-band and the second sub-band are both self-decodable units.

In certain embodiments, the second transmission 504 may include the third symbol RV2 514 and the fourth symbol RV3 516. In some embodiments, the third symbol RV2 514 (e.g., a first sub-band) is located at a central frequency portion of the second transmission 504, and the fourth symbol RV3 516 (e.g., a second sub-band) is located on both sides of the central frequency portion. In such embodiments, the first sub-band and the second sub-band may be substantially the same size; while, in other embodiments, the first sub-band and the second sub-band may be different in size. In some embodiments, only the first sub-band may be received and/or decoded by a remote unit 102; while, in other embodiments, both the first sub-band and the second sub-band may be received and/or decoded by a remote unit 102. In various embodiments, the first sub-band and the second sub-band are both self-decodable units. As may be appreciated, a remote unit 102 receiving the first sub-band of the first transmission 502 and the first sub-band of the second transmission 504 may receive the first symbol RV0 510 and the third symbol RV2 514. Furthermore, a remote unit 102 receiving the first and second sub-bands of the first transmission 502 and the first and second sub-bands of the second transmission 504 may receive the first symbol RV0 510, the second symbol RV1 512, the third symbol RV2 514, and the fourth symbol RV3 516.

In some embodiments, similar to PSS and/or SSS, PBCH may be transmitted with predefined subcarrier spacing and a predefined transmission BW, and the PBCH transmission BW may be the same as the SS transmission BW. In various embodiments, wideband PBCH transmission may be on 2 OFDM symbols per PBCH TTI (e.g., FIG. 5), for example, 48 RB PBCH BW, equivalently, 8.64 MHz PBCH BW for a frequency range below 6 GHz and 69.12 MHz PBCH BW for a frequency range above 6 GHz, may achieve similar coding rate as LTE PBCH (e.g., 6 RB PBCH BW, 4 OFDM symbols per frame, 4 frame TTI). If two PBCH OFDM symbols are transmitted on different frames as shown in FIG. 5, time diversity may be achieved. Furthermore, wideband transmission may exploit frequency diversity, and short PBCH transmission duration may enable flexible UL and/or DL TDD operation even when PBCH is transmitted in a predefined time instance.

In one embodiment, PBCH may be transmitted at predefined time (e.g. frame, slot, subframe, and/or OFDM symbols) and frequency radio resources. In some embodiments, once a remote unit 102 detects an SS block and acquires symbol, slot, and/or frame timing information from the detected SS block, the remote unit 102 may locate and/or receive PBCH based on the acquired timing information. In such embodiments, this may enable PBCH transmission sparser than SS in time. In certain embodiments, a payload in PBCH may include slot and/or frame timing related information (e.g., symbol index and/or slot index). In such embodiments, a remote unit 102 may acquire symbol timing information from the detected SS block and decode PBCH based on the acquired symbol timing in order to obtain slot and/or frame timing information.

In one embodiment, wideband PBCH includes two sub-bands with the same or different sizes, and one or more self-decodable segmentation units of coded and/or rate-matched PBCH channels bits transmitted on each sub-band. For example, FIG. 4 illustrates 4 symbol PBCH and FIG. 5 illustrates 2 symbol PBCH. In some embodiments, a few subcarriers between two sub-bands are reserved as guard subcarriers. In various embodiments, for a remote unit 102 operated with a smaller bandwidth (e.g., 24 RBs), narrow bandwidth (e.g., 24 RBs), and/or being bandlimited (e.g., 24 RBs), the remote unit 102 may receive only the center sub-band of wideband PBCH, and may perform decoding of redundancy versions ("RVs") transmitted on the center sub-band. In certain embodiments, such as with 2 symbol PBCH illustrated in FIG. 5, a narrowband remote unit 102 may combine RV0 510 and RV2 514 channel bits for PBCH decoding. In such embodiments, a narrowband operation may occur for remote units 102 with limited bandwidth capability and/or remote units 102 in a power saving mode. In some embodiments, such as for power saving remote units 102, a remote unit 102 operating bandwidth may be reduced to 5 MHz after the remote unit 102 performs an initial access with a 10 MHz bandwidth. In another embodiment, mapping of rate-matched PBCH channel coded bits to REs of a sub-band, mapping of a portion of PBCH channel coded bits to REs of a sub-band, and/or mapping of one or more rate-matched PBCH channel coded bits to a portion of REs of a sub-band (located approximately symmetric around a synchronization raster location—which may correspond to a central frequency portion of a PBCH transmission on a carrier) may be invariant to a PBCH transmission bandwidth. In certain embodiments, a few subcarriers around a sub-band may be reserved as guard subcarriers. In such embodiments, this may enable narrow bandwidth capable remote units 102, bandlimited capable remote units 102, and/or remote units 102 operating with a narrow bandwidth to receive PBCH in a narrow bandwidth and/or combine received PBCH REs on multiple PBCH symbols without different PBCH RE mapping for multiple PBCH transmission bandwidths.

In various embodiments, in order to decouple PSS and/or SSS periodicity and beamforming from PBCH periodicity and beamforming, PBCH DMRS may be transmitted together with PBCH data instead of using PSS and/or SSS as DMRS for PBCH. In one embodiment, while one transmit beam is used for one PSS and/or SSS instance and 48 PSS and/or SSS instances exist within an SS period of 80 ms, 48 transmit beams may be used on one wideband PBCH symbol via beam cycling and 4 PBCH symbols may exist within 80 ms TTI. In some embodiments, such as for the 4 symbol wideband PBCH of FIG. 4, DMRS of PBCH may be multiplexed with PBCH data in the frequency domain as shown in FIG. 6.

Figure 6:
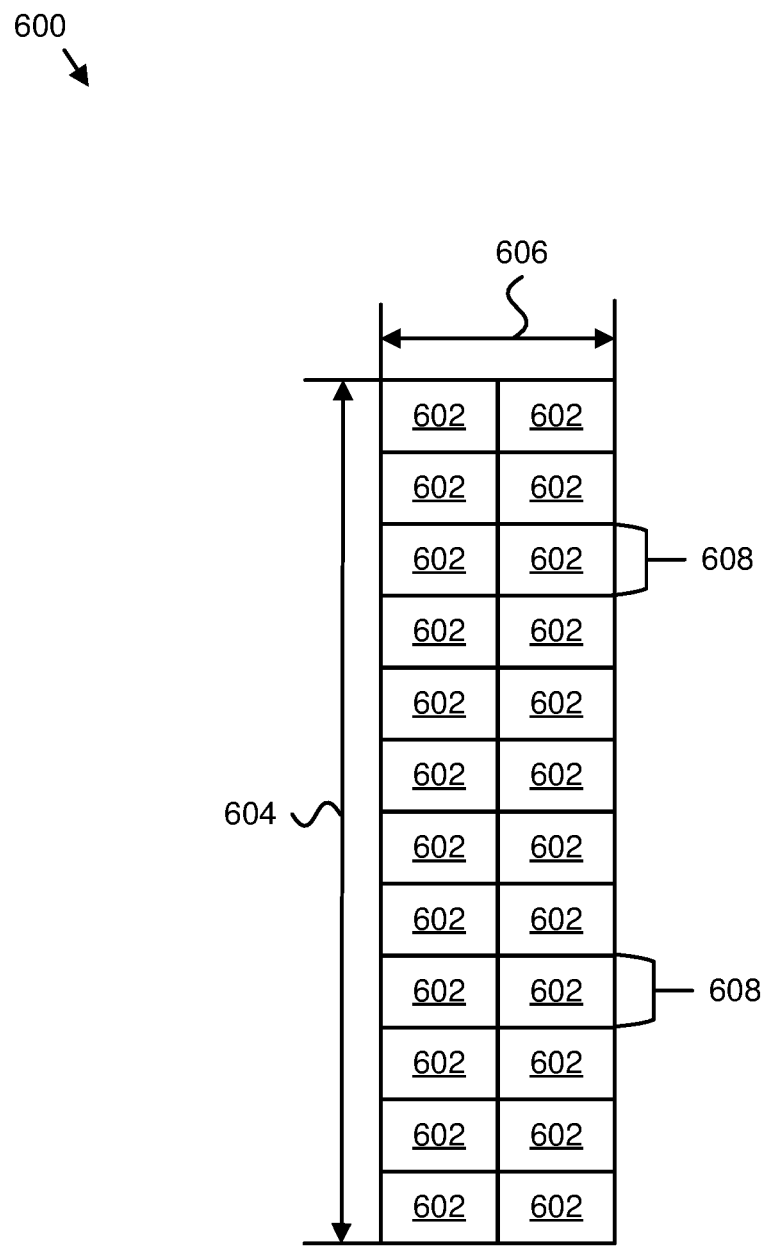
FIG. 6 illustrates one embodiment of DMRS multiplexing.

Specifically, FIG. 6 illustrates one embodiment of DMRS multiplexing 600. FIG. 6 illustrates two adjacent OFDM symbols 602 spanning a bandwidth 604 (e.g., 1 RB) over a time period 606 (e.g., two OFDM symbol duration). With the bandwidth, certain of the OFDM symbols 602 are used to carry DMRS. In particular, OFDM subcarriers 608 are used to carry DMRS. Because the DMRS may be transmitted on the same subcarriers of 2 consecutive OFDM symbols 602, a remote unit 102 may perform frequency-domain frequency offset estimation and/or compensation by comparing phase rotation of the DMRS on the same DMRS subcarriers of two OFDM symbols 602.

Figure 7:
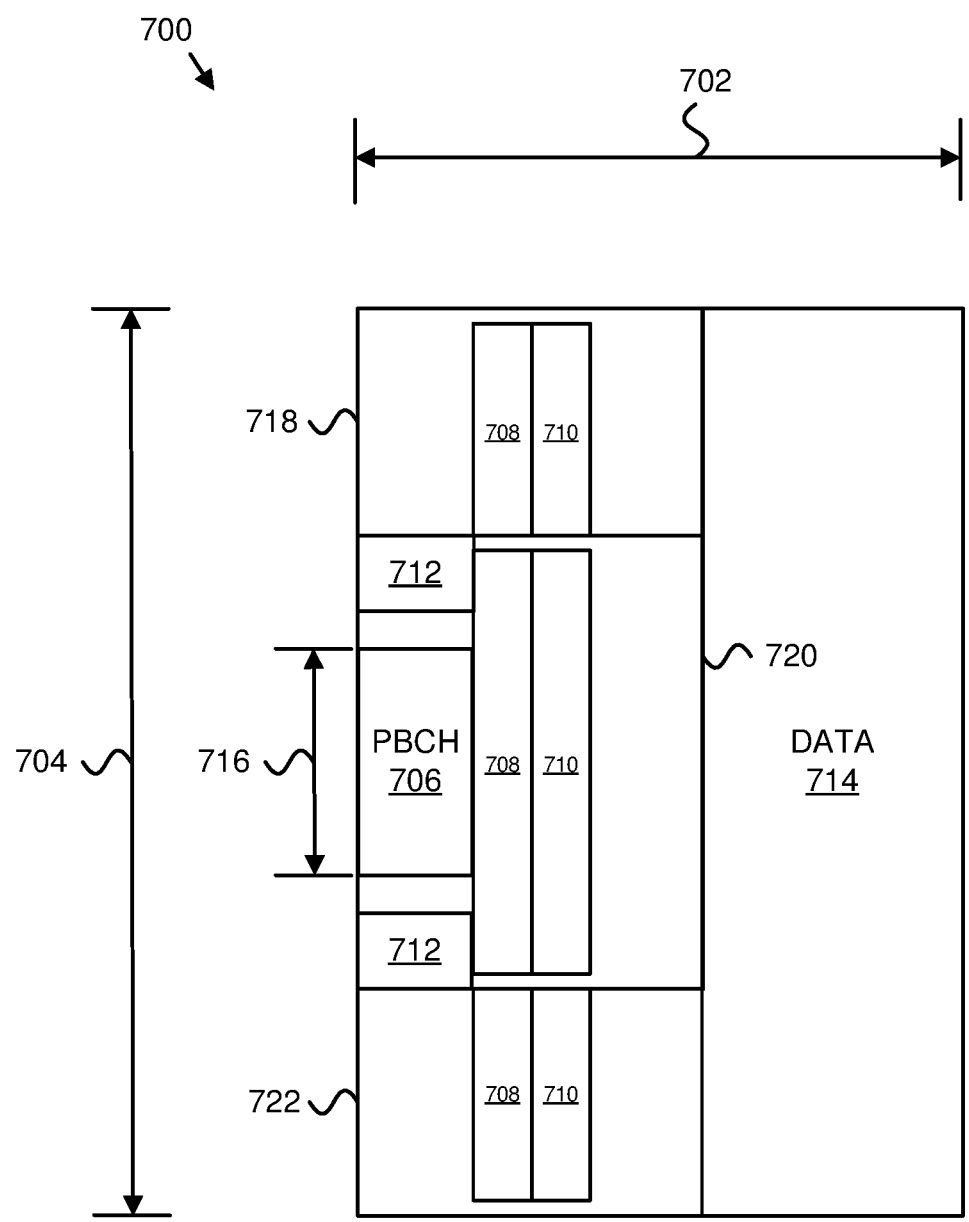
FIG. 7 illustrates one embodiment of transmissions in a slot.

FIG. 7 illustrates one embodiment of transmissions 700 in a slot 702 over a bandwidth 704. Specifically, the slot 702 may include PBCH 706, PSS 708, SSS 710, C-PDCCH 712, and data 714. In certain embodiments, the PBCH 706, the PSS 708, the SSS 710 (e.g., including one or more SSS), and the C-PDCCH 712 may be part of one SS block. In the illustrated embodiment, the PBCH 706 is transmitted over a sub-bandwidth 716 (e.g., 12 RBs). Moreover, the PSS 708 and the SSS 710 occupy some REs from a first control resource set 718, a second control resource set 720, and a third control resource set 722.

In one embodiment, a remote unit 102 may assume that a NE transmits SS blocks within an SS block transmission window. In such an embodiment, the SS block transmission window may include one or more slots within an SS burst set period. Furthermore, in certain embodiments, an SS block including the PSS 708, the SSS 710 (e.g., one or more SSS, a tertiary synchronization channel "TSCH," etc.), and the PBCH 706 may be transmitted in a DL control region of the slot 702 within an SS block transmission window. In various embodiments, a maximum of one SS block may be transmitted in a given slot. In some embodiments, a definition of an SS block transmission window may facilitate limiting signaling overhead for indicating an SS block location. However, in certain embodiments, a network may locate an SS block in any slot within a SS block transmission window depending on scheduling needs for UL and/or DL traffic. In various embodiments, even when a network serves UL dominated traffic, the network may still transmit SS blocks within a time window by exploiting a DL control region that may be configured in every slot.

In one embodiment, the DL control region is located in a front part of the slot 702, and the PBCH 706, the PSS 708, the SSS 710, and the C-PDCCH 712 are time-domain multiplexed as shown in FIG. 7. In another embodiment, the DL control region is located in a back part of the slot 702 (e.g., where the data 714 is shown in FIG. 7), and the PBCH 706, the PSS 708, the SSS 710, and the C-PDCCH 712 are time-domain multiplexed in the back part of the slot 702. In certain embodiments, the PBCH 706 may include one or two PBCH symbols. In various embodiments, the PBCH 706 may proceed the PSS 708 in the DL control region as illustrated; however, in other embodiments, the PBCH 706 may follow the SSS 710 in the DL control region or may be located between the PSS 708 and the SSS 710.

Figure 8:
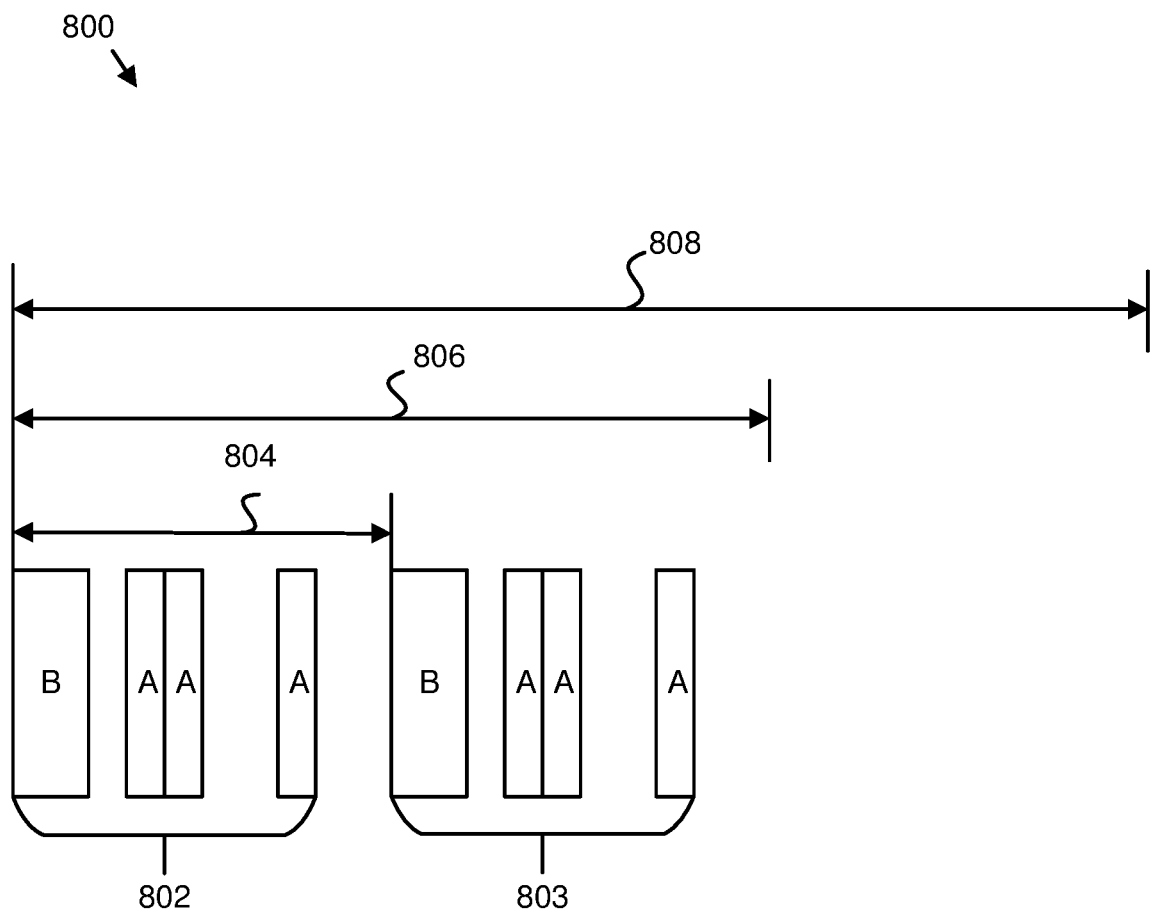
FIG. 8 illustrates one embodiment of SS block transmissions.

FIG. 8 illustrates one embodiment of SS block transmissions 800. The SS block transmissions 800 include a first group of SS blocks 802 and a second group of SS blocks 803. The first group of SS blocks 802 and the second group of SS blocks 803 each include one type of SS block (designated by A and including PSS and one or more SSS) and another type of SS block (designated by B and including PSS, one or more SSS, and PBCH). The first group of SS blocks 802 are transmitted over a transmission time 804 (e.g., 20 ms). Moreover, the first group of SS blocks 802 and the second group of SS blocks 803 are both transmitted within an SS block transmission window 806 (e.g., 40 ms). Furthermore, an SS burst set periodicity 808 (e.g., default of 80 ms) is illustrated.

In some embodiments, a maximum of two hundred SS blocks may be transmitted within the SS burst set periodicity 808. In certain embodiments, if a network is deployed in a frequency range above 6 GHz with a default subcarrier spacing of 120 KHz, slot duration may be 0.125 ms and 80 slots may be available per radio frame of 10 ms duration. In such embodiments, three hundred sixty slots may be available for transmission of potentially up to two hundred SS blocks. In various embodiments, the PBCH of 80 ms TTI is transmitted on one SS block of the first group of SS blocks 802 and one SS block of the second group of SS blocks 803 within the 80 ms SS burst set periodicity 808. In such embodiments, the first and second SS blocks 802 and 803 carrying PBCH are transmitted on slot 0 of radio frames $n_f$ fulfilling $n_f \bmod 8=0$ and $n_f \bmod 8=2$. Because in such embodiments the PBCH TTI is 80 ms, a payload of PBCH may carry 7 bits indicating a system frame number ("SFN") in which the SFN varies from 0 to 1023. In certain embodiments, a remote unit 102 may first determine a radio frame index within the 80 ms PBCH TTI by decoding a portion of a detected SS block. The portion of the detected SS block may include 2 bits indicating a radio frame index (e.g., with 4 possibilities) within the 40 ms SS block transmission window 806, 7 bits indicating a slot index (e.g., with 80 possibilities) within a radio frame, and cyclic redundancy check ("CRC") bits. In such embodiments, the remote unit 102 may detect PSS and/or SSS, decode a portion of the SS block, identify slot and/or frame timing information from the decoded portion of the SS block, and decode the PBCH from the SS block.

In some embodiments, an NE may indicate whether a slot of an SS block transmission window 806 carries an SS block or not, via C-PDCCH, so that a remote unit 102 monitoring a DL control region of the slot may properly identify available control channel elements and/or REs available for PDSCH if the SS block is mapped to a portion of the PDCCH and/or PDSCH region. In certain embodiments, in response to a remote unit 102 monitoring a slot within the SS block transmission window 806, the remote unit 102 may first receive and decode C-PDCCH, and then determine whether an SS block is transmitted in a DL control region of the slot (or anywhere in the slot). In various embodiments, control channel elements of a slot may be determined excluding resource elements used for PSS and/or SSS transmission. In one embodiment in which PSS and/or SSS transmission is mapped to a portion of a PDSCH region, REs available for PDSCH may be determined excluding PDSCH resource elements used for PSS and/or SSS transmission. In some embodiments, C-PDCCH may be transmitted in a first DL OFDM symbol of a slot, and one example of C-PDCCH transmission is shown in FIG. 7. In various embodiments, a network configures a larger DL control region for slots corresponding to the SS block transmission window 806, to avoid a potential control channel resource deficiency and/or a control channel blocking issue.

Figure 9:
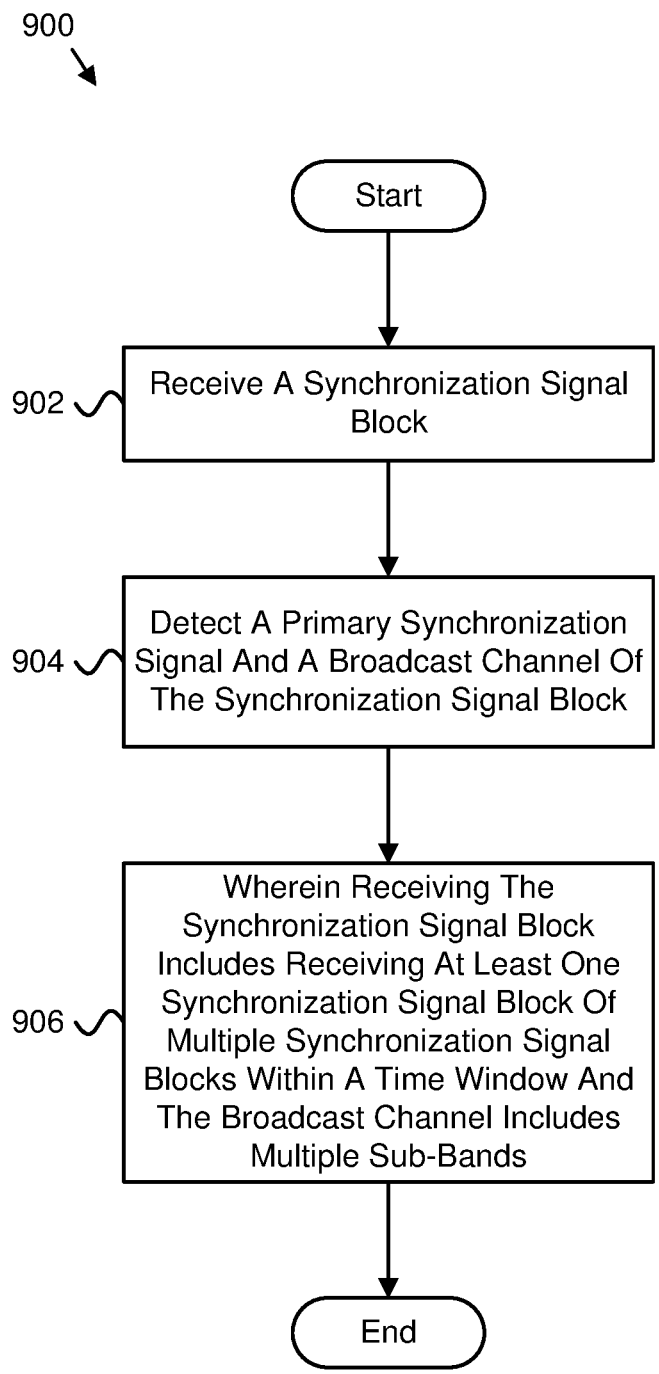
FIG. 9 is a schematic flow chart diagram illustrating one embodiment of a method for receiving a synchronization signal block.

FIG. 9 is a schematic flow chart diagram illustrating one embodiment of a method 900 for receiving a synchronization signal block. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a synchronization signal block. In various embodiments, the method 900 includes detecting 904 a primary synchronization signal and a broadcast channel of the synchronization signal block. In some embodiments, receiving the synchronization signal block includes 906 receiving at least one synchronization signal block of multiple synchronization signal blocks within a time window and the broadcast channel includes multiple sub-bands.

In certain embodiments, at least one sub-band of the multiple sub-bands carries a self-decodable unit. In one embodiment, the method 900 includes detecting at least one secondary synchronization signal of the synchronization signal block. In a further embodiment, each sub-band of the multiple sub-bands carries at least one self-decodable unit. In certain embodiments, a first sub-band of the multiple sub-bands is a same size as a second sub-band of the multiple sub-bands. In various embodiments, a first sub-band of the multiple sub-bands is a different size than a second sub-band of the multiple sub-bands. In some embodiments, a first sub-band of the multiple sub-bands is located at a central portion of the broadcast channel, and a second sub-band of the multiple sub-bands is located on both sides of the central portion. In certain embodiments, the method 900 includes receiving only the first sub-band and decoding channel bits transmitted on the first sub-band.

In various embodiments, the at least one self-decodable unit includes coded and rate-matched channel bits. In some embodiments, the primary synchronization signal, at least one secondary synchronization signal, and the broadcast channel are transmitted in one slot. In certain embodiments, the method 900 includes determining slot and frame timing information from the synchronization signal block. In various embodiments, the time window including the multiple synchronization signal blocks occurs periodically. In some embodiments, the time window includes 5 ms or 10 ms. In certain embodiments, the broadcast channel carries a system frame number. In various embodiments, the broadcast channel carries slot and frame timing related information.

In some embodiments, the method 900 includes: receiving a common control channel in a first slot; determining whether a synchronization signal block is transmitted in a downlink region of the first slot based on the common control channel; and identifying available downlink resource elements for a physical downlink shared channel or a physical downlink control channel in the downlink region of the first slot. In certain embodiments, the first slot is within a synchronization signal block transmission window, and the synchronization signal block transmission window includes at least one slot for transmitting synchronization signal blocks. In various embodiments, a size of a downlink control region of the first slot is different from a size of a downlink control region of a second slot, and the second slot is not within the synchronization signal block transmission window.

Figure 10:
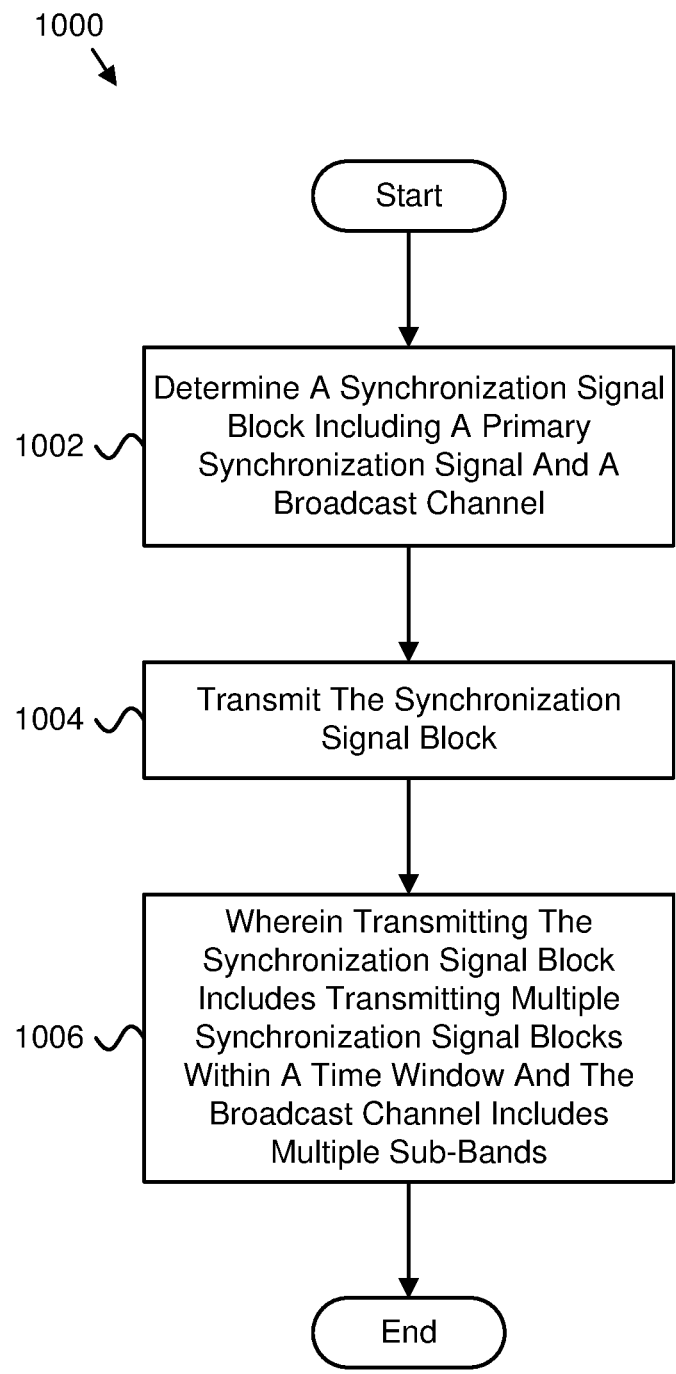
FIG. 10 is a schematic flow chart diagram illustrating one embodiment of a method for transmitting a synchronization signal block.

FIG. 10 is a schematic flow chart diagram illustrating one embodiment of a method 1000 for transmitting a synchronization signal block. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include determining 1002 a synchronization signal block including a primary synchronization signal and a broadcast channel. In various embodiments, the method 1000 includes transmitting 1004 the synchronization signal block. In certain embodiments, transmitting the synchronization signal block includes 1006 transmitting multiple synchronization signal blocks within a time window and the broadcast channel includes multiple sub-bands.

In certain embodiments, at least one sub-band of the multiple sub-bands carries a self-decodable unit. In one embodiment, the method 1000 includes determining at least one secondary synchronization signal of the synchronization signal block. In a further embodiment, each sub-band of the multiple sub-bands carries at least one self-decodable unit. In certain embodiments, a first sub-band of the multiple sub-bands is a same size as a second sub-band of the multiple sub-bands. In various embodiments, a first sub-band of the multiple sub-bands is a different size than a second sub-band of the multiple sub-bands. In some embodiments, a first sub-band of the multiple sub-bands is located at a central portion of the broadcast channel, and a second sub-band of the multiple sub-bands is located on both sides of the central portion.

In various embodiments, the at least one self-decodable unit includes coded and rate-matched channel bits. In some embodiments, the primary synchronization signal, at least one secondary synchronization signal, and the broadcast channel are transmitted in one slot. In certain embodiments, slot and frame timing information are determined from the synchronization signal block. In various embodiments, the time window including the multiple synchronization signal blocks occurs periodically. In some embodiments, the time window includes 5 ms or 10 ms. In certain embodiments, the broadcast channel carries a system frame number. In various embodiments, the broadcast channel carries slot and frame timing related information.

In some embodiments, the method 1000 includes transmitting a common control channel in a first slot. In certain embodiments, the first slot is within a synchronization signal block transmission window, and the synchronization signal block transmission window includes at least one slot for transmitting synchronization signal blocks. In various embodiments, a size of a downlink control region of the first slot is different from a size of a downlink control region of a second slot, and the second slot is not within the synchronization signal block transmission window.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving a synchronization signal block; and
   detecting a primary synchronization signal of the received synchronization signal block; and
   detecting a subportion of a broadcast channel of the received synchronization signal block,
   wherein the broadcast channel comprises a plurality of sub-bands,
   wherein the detecting of the subportion comprises detecting only a first sub-band among the plurality of sub-bands of the broadcast channel,
   the first sub-band of the broadcast channel comprises a subportion of broadcast channel bits, and
   the subportion of broadcast channel bits is independently decoded into information that is used;
   wherein receiving the synchronization signal block comprises receiving at least one synchronization signal block of a plurality of synchronization signal blocks placed at a plurality of time instances within a 5 ms time window.

2. The method of claim 1, further comprising detecting at least one secondary synchronization signal of the synchronization signal block.

3. The method of claim 1,
   wherein each sub-band of the plurality of sub-bands carries at least one self-decodable unit.

4. The method of claim 3,
   wherein the at least one self-decodable unit comprises coded and rate-matched channel bits.

5. The method of claim 1,
   wherein the first sub-band of the plurality of sub-bands is a same size as a second sub-band of the plurality of sub-bands.

6. The method of claim 1,
   wherein the first sub-band of the plurality of sub-bands is a different size than a second sub-band of the plurality of sub-bands.

7. The method of claim 1,
   wherein the first sub-band of the plurality of sub-bands is located at a central portion of the broadcast channel, and a second sub-band of the plurality of sub-bands is located on both sides of the central portion.

8. The method of claim 7, further comprising receiving only the first sub-band of plurality of sub-bands.

9. The method of claim 1,
   wherein the primary synchronization signal, at least one secondary synchronization signal, and the broadcast channel are transmitted in one slot.

10. The method of claim 1, further comprising determining slot and frame timing information from the synchronization signal block.

11. The method of claim 1,
    wherein the 5 ms time window including the plurality of synchronization signal blocks occurs periodically.

12. The method of claim 1,
    wherein the broadcast channel carries a system frame number.

13. The method of claim 1,
    wherein the broadcast channel carries slot and frame timing related information.

14. The method of claim 1, further comprising:
    receiving a common control channel in a first slot;
    determining whether the synchronization signal block is transmitted in a downlink region of the first slot based on the common control channel; and
    identifying available downlink resource elements for a physical downlink shared channel or a physical downlink control channel in the downlink region of the first slot.

15. The method of claim 14,
    wherein the first slot is within a synchronization signal block transmission window, and
    the synchronization signal block transmission window comprises at least one slot for transmitting synchronization signal blocks.

16. The method of claim 15,
    wherein a size of a downlink control region of the first slot is different from a size of a downlink control region of a second slot, and the second slot is not within the synchronization signal block transmission window.

17. An apparatus comprising:
    a receiver that receives a synchronization signal block; and
    a processor that:
    detects a primary synchronization signal of the received synchronization signal block; and
    detects a subportion of a broadcast channel of the received synchronization signal block,
    wherein the broadcast channel comprises a plurality of sub-bands,
    wherein the detecting of the subportion comprises detecting only a first sub-band among the plurality of sub-bands of the broadcast channel,
    the first sub-band the broadcast channel comprises a subportion of broadcast channel bits, and
    the subportion of broadcast channel bits is independently decoded into information that is used;
    wherein receiving the synchronization signal block comprises receiving at least one synchronization signal block of a plurality of synchronization signal blocks placed at a plurality of time instances within a 5 ms time window.

18. The apparatus of claim 17,
wherein each sub-band of the plurality of sub-bands carries at least one self-decodable unit.

19. A method comprising:

determining a synchronization signal block comprising a primary synchronization signal and a broadcast channel, wherein the broadcast channel comprises a plurality of sub-bands; and transmitting, to a receiving device, the synchronization signal block, wherein transmitting the synchronization signal block comprises transmitting at least one synchronization signal block of a plurality of synchronization signal blocks placed at a plurality of time instances within a 5 ms time window, wherein the receiving device detects a subportion of the broadcast channel of the synchronization by at least detecting only a first sub-band among the plurality of sub-bands of the broadcast channel, wherein the first sub-band of the broadcast channel comprises a subportion of broadcast channel bits, and wherein the subportion of broadcast channel bits is independently decoded into information that is used.

20. The method of claim 19,
wherein the primary synchronization signal, at least one secondary synchronization signal, and the broadcast channel are transmitted in one slot.

21. An apparatus comprising:

a processor that determines a synchronization signal block comprising a primary synchronization signal and a broadcast channel, wherein the broadcast channel comprises a plurality of sub-bands; and a transmitter that transmits, to a receiving device, the synchronization signal block, wherein the transmitter transmitting the synchronization signal block comprises the transmitter transmitting at least one synchronization signal block of a plurality of synchronization signal blocks placed at a plurality of time instances within a 5 ms time window, wherein the receiving device detects a subportion of the broadcast channel of the synchronization signal block, by at least detecting only a first sub-band among the plurality of sub-bands of the broadcast channel, the first sub-band of the broadcast channel comprises a subportion of broadcast channel bits, and the subportion of broadcast channel bits is independently decoded into information that is used.

22. The apparatus of claim 21,
wherein the time window including the plurality of synchronization signal blocks occurs periodically.

* * * * *